US010062299B1

(12) United States Patent
Salloum

(10) Patent No.: US 10,062,299 B1
(45) Date of Patent: Aug. 28, 2018

(54) ARITHMETIC EDUCATIONAL TOOL

(71) Applicant: Thanaa Salloum, Phoenix, AZ (US)

(72) Inventor: Thanaa Salloum, Phoenix, AZ (US)

(73) Assignee: Bonderiffic Math LLC, Phoenix, AZ (US)

( * ) Notice: Subject to any disclaimer, the term of this patent is extended or adjusted under 35 U.S.C. 154(b) by 295 days.

(21) Appl. No.: 14/961,690

(22) Filed: Dec. 7, 2015

(51) Int. Cl.
  *G09B 19/02* (2006.01)
  *G09B 1/02* (2006.01)
(52) U.S. Cl.
  CPC ............... *G09B 19/02* (2013.01); *G09B 1/02* (2013.01)
(58) Field of Classification Search
  None
  See application file for complete search history.

(56) References Cited

U.S. PATENT DOCUMENTS

| | | | |
|---|---|---|---|
| 3,793,470 A | 2/1974 | Christy et al. | |
| 3,864,850 A * | 2/1975 | Helmecke | G09B 19/02 434/207 |
| 4,006,344 A * | 2/1977 | Schutte | G06C 1/00 235/61 R |
| 4,553,944 A * | 11/1985 | Flanagan | G09B 19/02 434/191 |
| 5,529,497 A * | 6/1996 | Bigold | G09B 1/02 434/191 |
| 5,876,212 A | 3/1999 | Hartung | |
| 5,989,035 A * | 11/1999 | Okoye | G09B 19/02 206/315.1 |
| 7,695,283 B2 | 4/2010 | Buhrman | |
| 9,542,857 B2 * | 1/2017 | Ito | G09B 19/02 |
| 2011/0311953 A1 | 12/2011 | Goll | |

* cited by examiner

*Primary Examiner* — Sunit Pandya
(74) *Attorney, Agent, or Firm* — Invention to Patent Services; Alex Hobson

(57) ABSTRACT

The arithmetic educational tool utilizes a container having a main chamber and two extended chambers from the main chamber to visually demonstrate addition and subtraction. Objects placed with the container will move from the main chamber into the extended chambers when the container is tilted and thereby break the number objects in the main chamber into parts. The container is bifurcated, having the two extended chambers branching off of from the main chamber and thereby causes a random splitting of the number of objects into each of the extended chamber. Conversely, objects placed in each of the extended chambers can be added when the chamber is tilted to cause the object to move from the extended chambers into the main chamber. One or more of the chambers may have an obscuring feature, such as a color or slidably cover, that enables obscuring the number of objects therein.

18 Claims, 10 Drawing Sheets

ARITHMETIC EDUCATIONAL TOOL

BACKGROUND OF THE INVENTION

Field of the Invention

The invention relates to a tool for facilitating arithmetic education through visual demonstration.

Background

It is well known that people have different learning proficiencies through different educational means or styles. Some people can effectively learn through bookwork, while others learn best through lectures or audible communication, and many people learn best through visual education. Mathematics and particularly arithmetic is taught at an early age through workbooks. These workbooks may have drawings of objects that are added together but this is only two-dimensional and some students may not appreciate or effectively learn through this method. There is a need for an educational tool that can be used to facilitated arithmetic education.

SUMMARY OF THE INVENTION

The invention is directed to an arithmetic educational tool that comprises a bifurcated container having a main chamber and two extended chambers for receiving objects that can move from the main chamber to the two extended chambers, or from the two extended chambers to the main chamber. The movement of the objects with in the container can be used to visually demonstrate addition and subtraction or composition, decomposition. The arithmetic educational tool is well suited for teaching addition/subtraction in the lower grades, such as kindergarten through third grade and for special needs students.

The movement of objects from the main chamber to the two extended chambers, and vice versa can effectively visually demonstrate the decomposition and composition of a number. For example, when adding two numbers, two groups of objects are placed in the first and second chambers, such as two objects in the first chamber and three objects in the second container. The container is then tilted so the first and second chambers are elevated with respect to the main chamber. The objects then move from the first and second chambers to the main chamber where they can be counted and thereby educate a student to the addition of the objects from the first and second chambers, or composition of two numbers. The following example would illustrate the equation (2+3=5). A chamber may have a transparent side and an opaque side and may be configured to rotate to expose the objects within the chamber, thereby providing the student an opportunity to guess the correct answer before the actual number of objects is exposed. For example, three objects may be placed in the first chamber and five objects in the second chamber. A teacher may rotate the main chamber to hide the number of objects that collect in the main chamber when the container is tilted with the main chamber in a down position. The teacher may ask the student how many objects are in the main chamber before rotating the main chamber to expose the actual number of objects therein. This Illustrates the equation, (3+5=?). A student may be asked to solve this equation by answering how many objects are in the main chamber before it is exposed. A chamber may comprise a slidable cover that enables obscuring and exposing the contents of a chamber. A slidable cover and a collar that enables rotation of the chambers are examples of obscuring features.

An exemplary arithmetic educational tool may be used to demonstrate subtraction or decomposition of a number into two smaller numbers. For example, seven objects may be placed the main chamber and counted while the main chamber is in down orientation with respect to the two extended chambers. One of the extended chambers may be rotated to obscure the object collected therein. The container may then be oriented with the main chamber in an up position to the first and second chambers, thereby causing the objects to move from the main chamber into the two extended chambers. The student may then count the number of objects in the extended chamber that is exposed, or has the transparent portion facing the student. For example, three of the objects may move into the first exposed chamber and four may move into the second obscured chamber. The teacher may ask the student how many objects are in the second chamber before rotating the second chamber to expose the number of objects therein. The student is challenged with the equation (7-3=?). The arithmetic educational tool thereby illustrates the equation (7-3=4). Again, for the purposes of illustrating the concept of subtraction, one of the extended chambers may be covered by a slidable cover, thereby requiring the student to determine how many objects are in the covered container by subtracting the number in the extended chamber that is not covered. For example the first chamber may be covered by a slidably cover, thereby leaving four objects in the second chamber to be subtracted from the number of objects in the main chamber, as expressed in the equation, 7-4=3. The movement of the objects from the main chamber to the two extended chambers may be random and thereby provide any number of decomposition examples of a number of objects within the main chamber.

An exemplary arithmetic educational tool comprises a bifurcated container having a main chamber and two extended chambers, for receiving objects that can move from the main chamber to the two extended chambers or from the two extended chambers to the main chamber. The container, or at least a portion of the chambers of the container, may be made out of a translucent or transparent material to allow counting of the objects through the exterior wall. The interior volume of the container is contiguous, enabling the objects to move feely therein. The main chamber may have a base that is planar to allow the bifurcated container to be self-standing on the main chamber base, wherein the two extended chambers are elevated from the main chamber base. The two extended chambers may also have planar bases and they may be aligned and parallel with each other to allow the container to be self-standing on the two extended chamber bases. The main chamber and two extended chamber bases may be parallel with each other, creating a planar first and second end of the container that is perpendicular to a length axis.

In an exemplary embodiment, the bifurcated container comprises an insertion aperture in the exterior wall to enable objects to be placed therein. An insertion aperture may be just larger than the outer dimension of an object, or diameter, to allow the objects to be placed into the container and to prevent them from inadvertently coming out of the insertion aperture. An insertion aperture may be configured in a main chamber, one or more of the first and second chambers, in a connection portion, a bifurcated portion, a base, and the like. In a preferred embodiment, a insertion aperture is configured in each of the chambers to enable a student to count the objects as they are placed therein. The insertion aperture may be configured above the height where the objects would collect or stack within a chamber when that chamber is in down position.

In an exemplary embodiment, the bifurcated container comprises a cap that is configured over a base aperture to allow the quick removal of the objects from the container. A cap may be configured over the main chamber only, or on one or both of the extended chamber bases. In an exemplary embodiment, the bifurcated container comprises a cap on each of the chamber bases. A cap may be any suitable type of cap for dosing a base aperture and may be a lid that extends around the base of the chamber, a cap having threads that mate with threads on the container, a plug, a sliding cap or closure feature, and the like. A screw cap may be preferred as it will resist popping off if the objects impact the cap as the drop into a chamber.

The chambers may be configured with detents in the base to allow the objects to rest in a still position to allow easier counting, as the objects will be prevented from moving. For example, the objects may be balls, or spherical in shape and the detents may be concave areas in the Interior surface of the chamber base and the balls may come to rest in the concave detents. In another embodiment, the interior base surface of a chamber is sloped toward a front of the bifurcated container to cause the objects to rest against the front wall of the chamber to facilitate counting. In still another embodiment, the diameter or depth of the interior of the chamber is just larger than the diameter or cross-dimension of the object which keeps the objects in a planar arrangement with respect to each other within the container and will therefore stack on each other to facilitate counting.

The first and second chamber may extend from a bifurcated portion of the container and extend in different directions, whereby the two chambers are separated from each other by and offset distance. In another embodiment, the first and second chamber may extend or branch from the main chamber directly and a deflector may be configured within the interior of the main chamber to divert objects into the first and second chambers.

An exemplary bifurcated container may comprise one or more rotating collars that enable a chamber to rotate from an orientation where the front and transparent side is exposed to a user, to an orientation where the back and obscured or opaque side is exposed to the user. As described herein, this rotational feature enables the teacher to illustrate equations and challenge the student with calculating an answer before exposing the number of objects within the chamber. A collar may simply be the overlap of a chamber with a bifurcated portion of the container or connecting portion of the container. In an exemplary embodiment, a connecting portion is a separate part having three openings and a raised perimeter around the openings for coupling to the chambers and for creating the rotating collar attachment to the chambers. For example, a chamber opening, for receiving objects from the other chambers, may extend around an enlarged end of a connecting portion and thereby retain the chamber to the connecting portion and enable the connection portion to rotate. A obscuring feature may comprise a slidable cover. A chamber may comprise a slidable cover can be slid over a portion of the chamber to hide or conceal how many objects are therein. A slidable cover may be coupled with the exterior wall of the chamber and have a raised handle or tab to move the slidable cover.

A chamber may be any suitable shape and be large enough to accommodate a plurality of objects within the interior volume. In one embodiment, a chamber is cylindrical in shape and may have a diameter that is large enough to accommodate a single object, but not large enough to accommodate two objects side by side along the length of the cylinder. A chamber may be circular in shape at the base of the chamber and truncate in diameter as it extends to the bifurcated portion, as defined herein as a flask shape. A chamber may have a depth that is large enough to accommodate a single object within the depth, but not large enough to accommodate two objects within the depth dimension, thereby causing the objects to stack within the chamber for easy counting. In one embodiment, the chambers are square or rectangular in cross-sectional shape and again, have a depth that accommodates a single object.

The arithmetic tool of the present invention may be sized to allow effective one-on-one education or sized to allow a teacher to teach a small group or even entire classroom. For individual teaching, the length of the container may be about 15 cm or more, about 25 cm or more or about 40 cm or more. For teaching a small group, the length of the container may be about 25 cm or more or about 50 cm or more. For teaching an entire classroom, the length of the container may be about 50 cm or more, about 75 cm or more or about 1 m or more. A container may have any length between and including the length values provided. It is to be understood that the diameter or cross-dimension of the objects may be scaled according to the size of the container, wherein the smaller sized containers may have objects having a diameter of about 10 mm or more and wherein the larger containers may have object having a diameter of about 25 mm to about 50 mm or greater. The diameter of the chambers may be sized to accommodate any number of objects, such as ten, fifteen, or twenty or more.

The objects may be any suitable objects that can move freely within the interior volume of the container and are preferably balls or spheres, such as marbles, for example. The objects may be different colors to represent base ten numbers and any number of objects may be part of the arithmetic educational tool including, but not limited to eight, ten, fifteen, twenty or more and the like. It is preferred that the arithmetic educational tool comprise and accommodate at least ten objects to enable education of addition/subtraction of numbers within the range of ten or more. The objects may be any suitable size including, but not limited to about 10 mm, about 20 mm, about 40 mm or about 50 mm in diameter and any range between and including the diameter values provided. An object may be sized slightly smaller than the diameter of an insertion aperture diameter, such as being about 90% of the insertion aperture diameter or larger or about 80% of the insertion aperture diameter or larger. When the diameter of the object is about the same size as the insertion aperture it reduces the likely hood that the objects will fall out of the insertion aperture during use.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
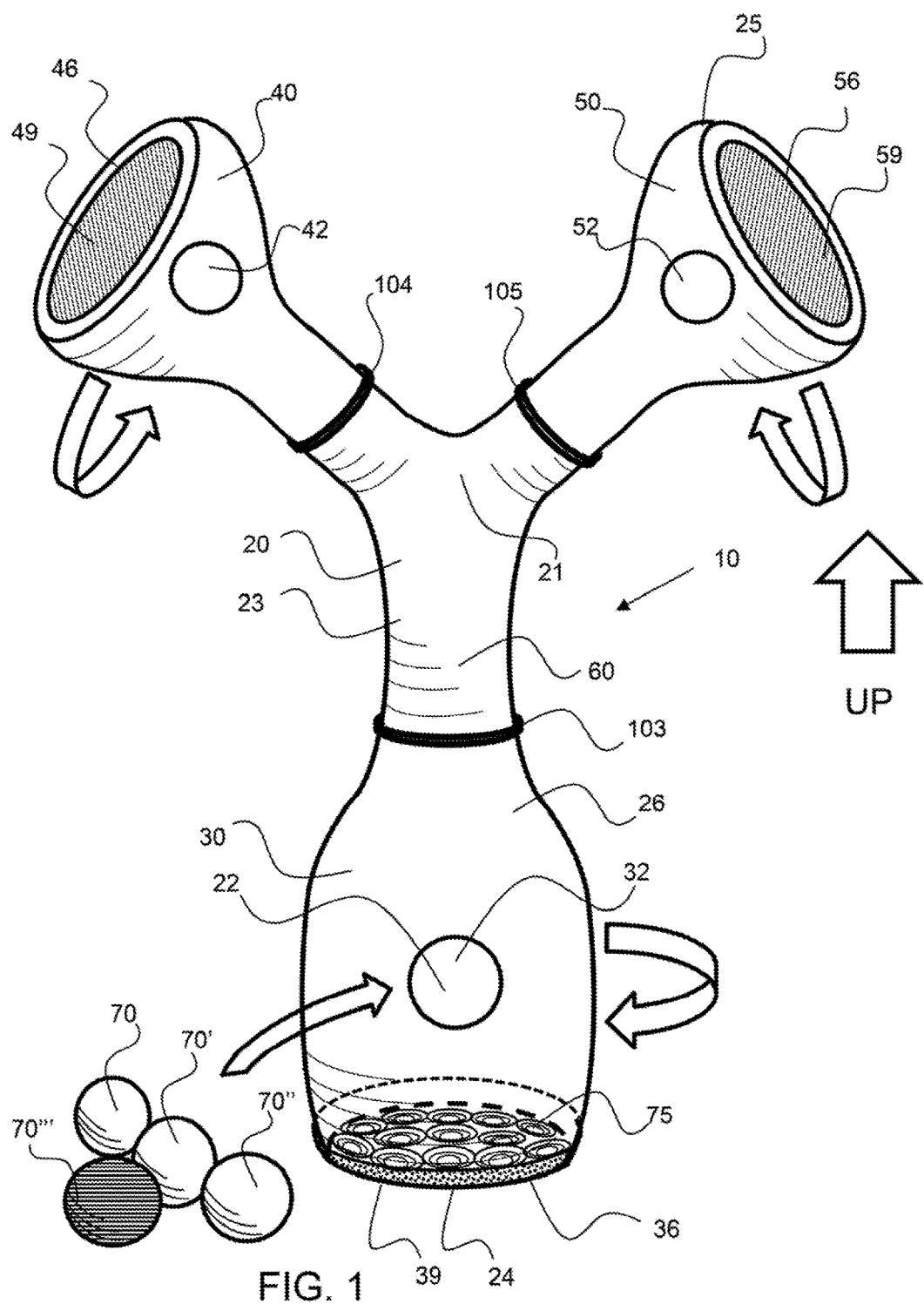

FIG. 1 shows an exemplary arithmetic educational tool having a main chamber and two extended chambers, wherein the main chamber is in a declined configuration with respect to the two extended chambers.

Figure 2:
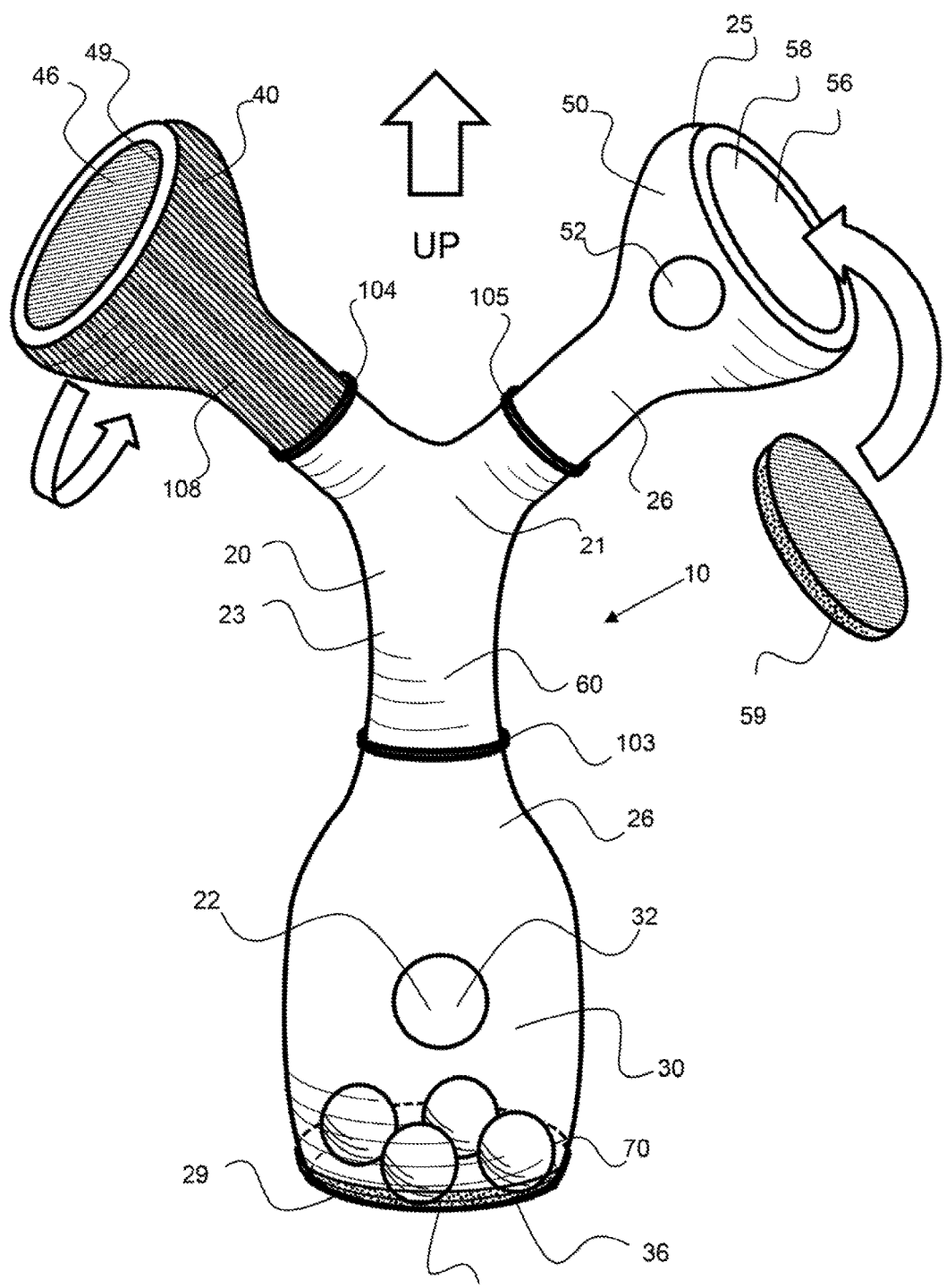

FIG. 2 shows an exemplary the arithmetic educational tool shown in FIG. 1 with the four objects placed within the interior volume of the main chamber and the cap of one of the extended chambers removed.

Figure 3:
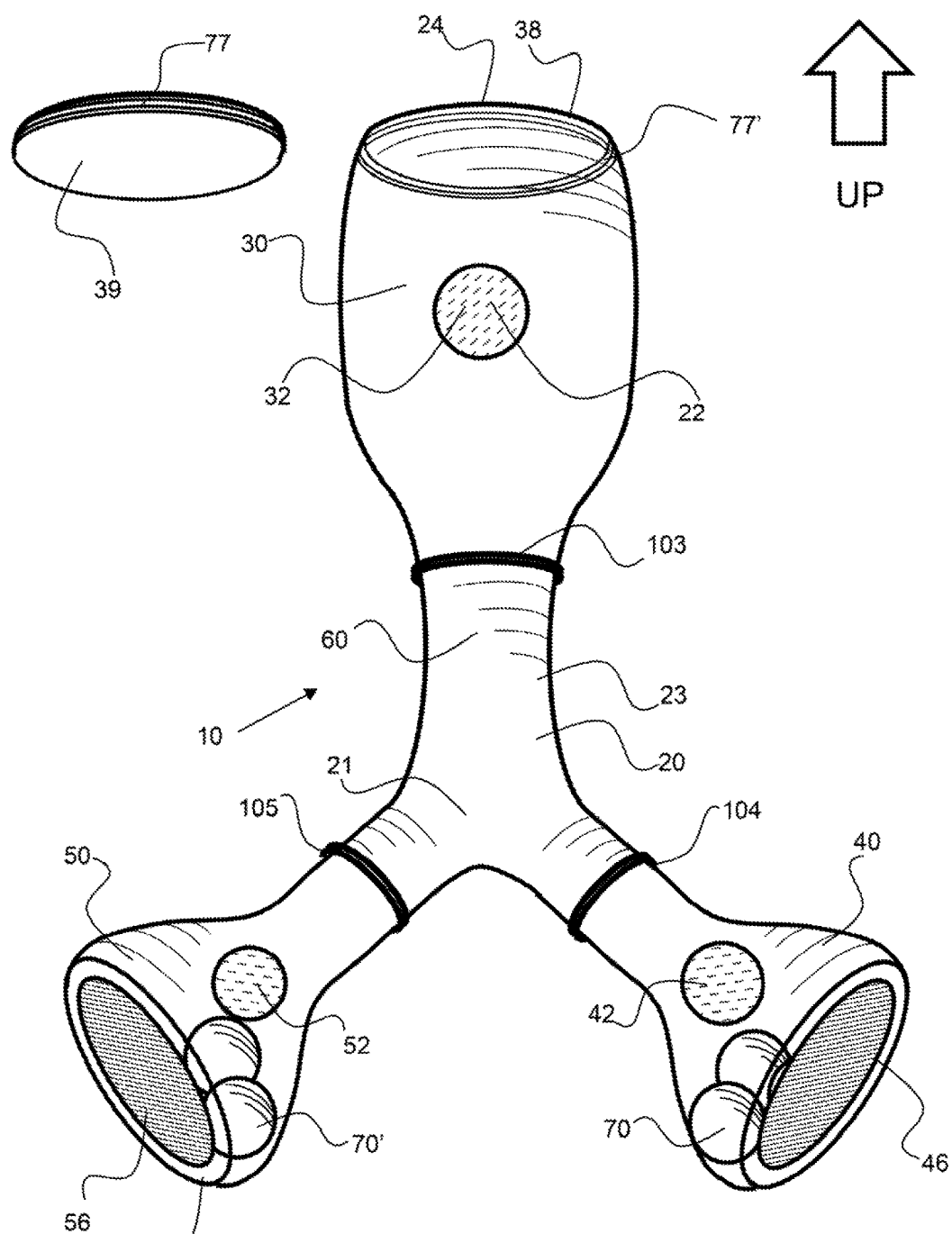

FIG. 3 shows the exemplary arithmetic educational tool shown in FIG. 2 with the main chamber in an elevated or up configuration with respect to the two extended chambers and the four objects retained in the two extended chambers.

Figure 4:
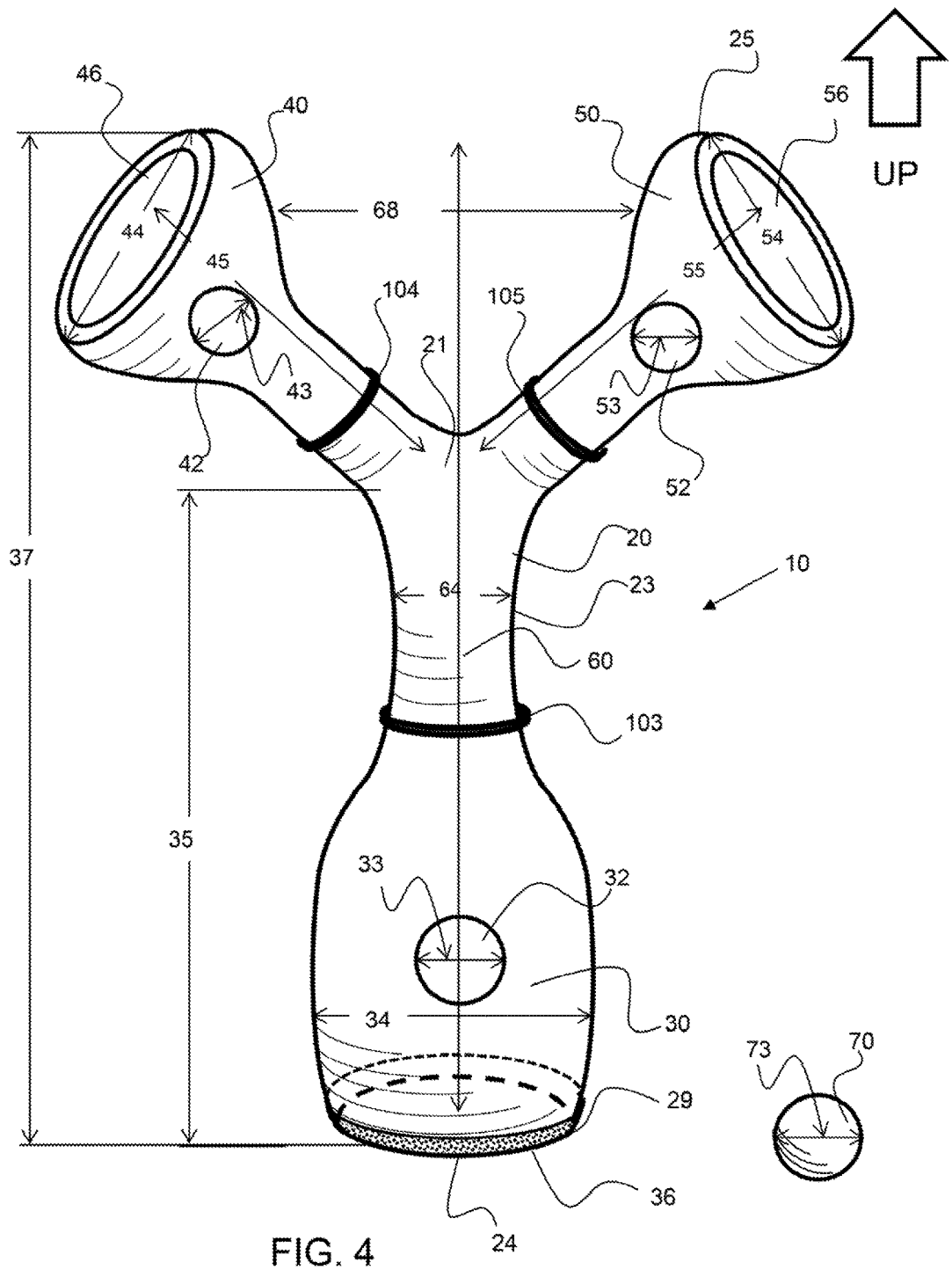

FIG. 4 shows an exemplary arithmetic educational tool having a main chamber, a first extended chamber, a second extended chamber and a bifurcated portion.

Figure 5:
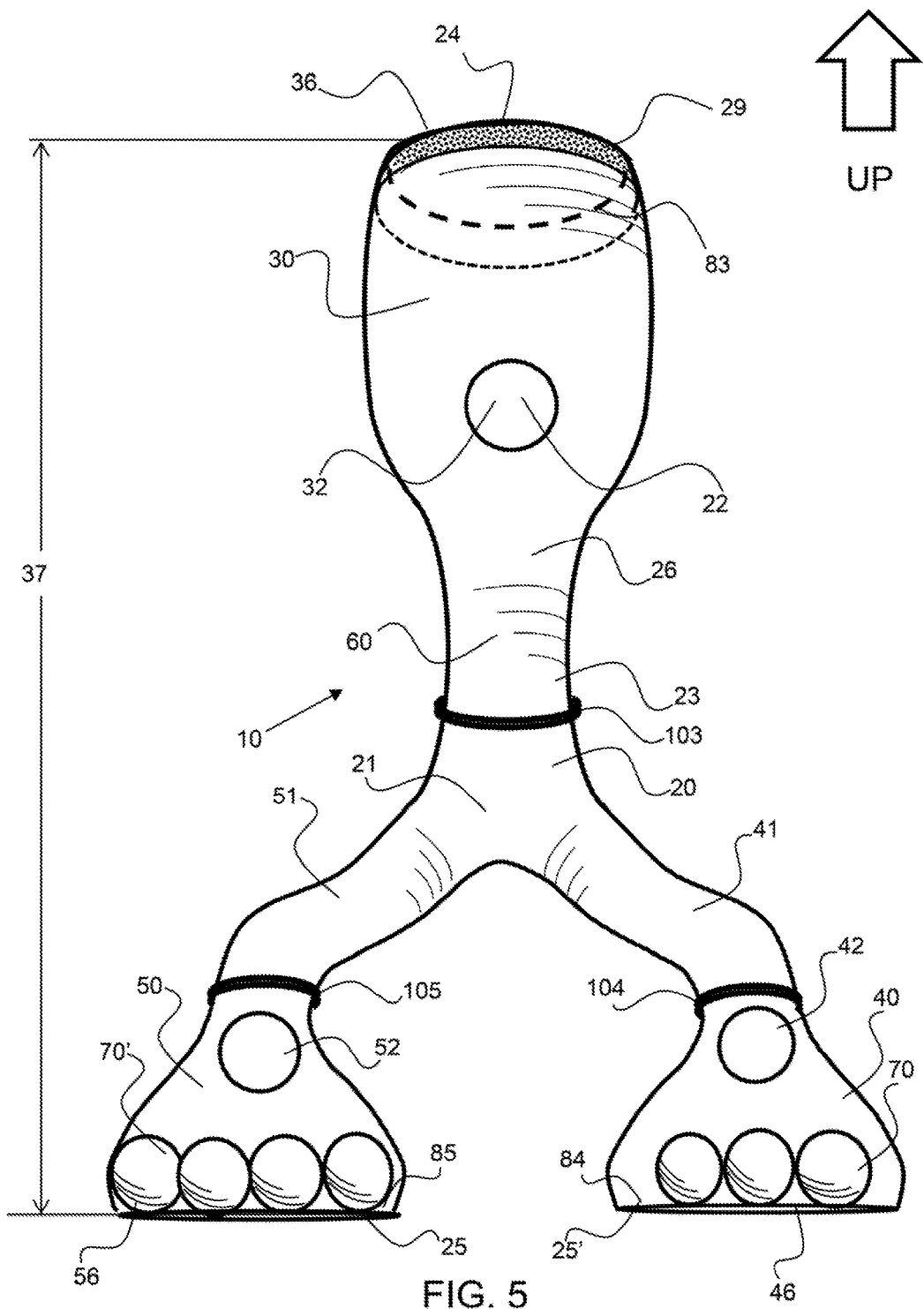

FIG. 5 shows an exemplary arithmetic educational tool comprising a bifurcated container that is resting on the base of the two extended chambers, wherein there are seven objects contained within the two extended chambers.

Figure 6:
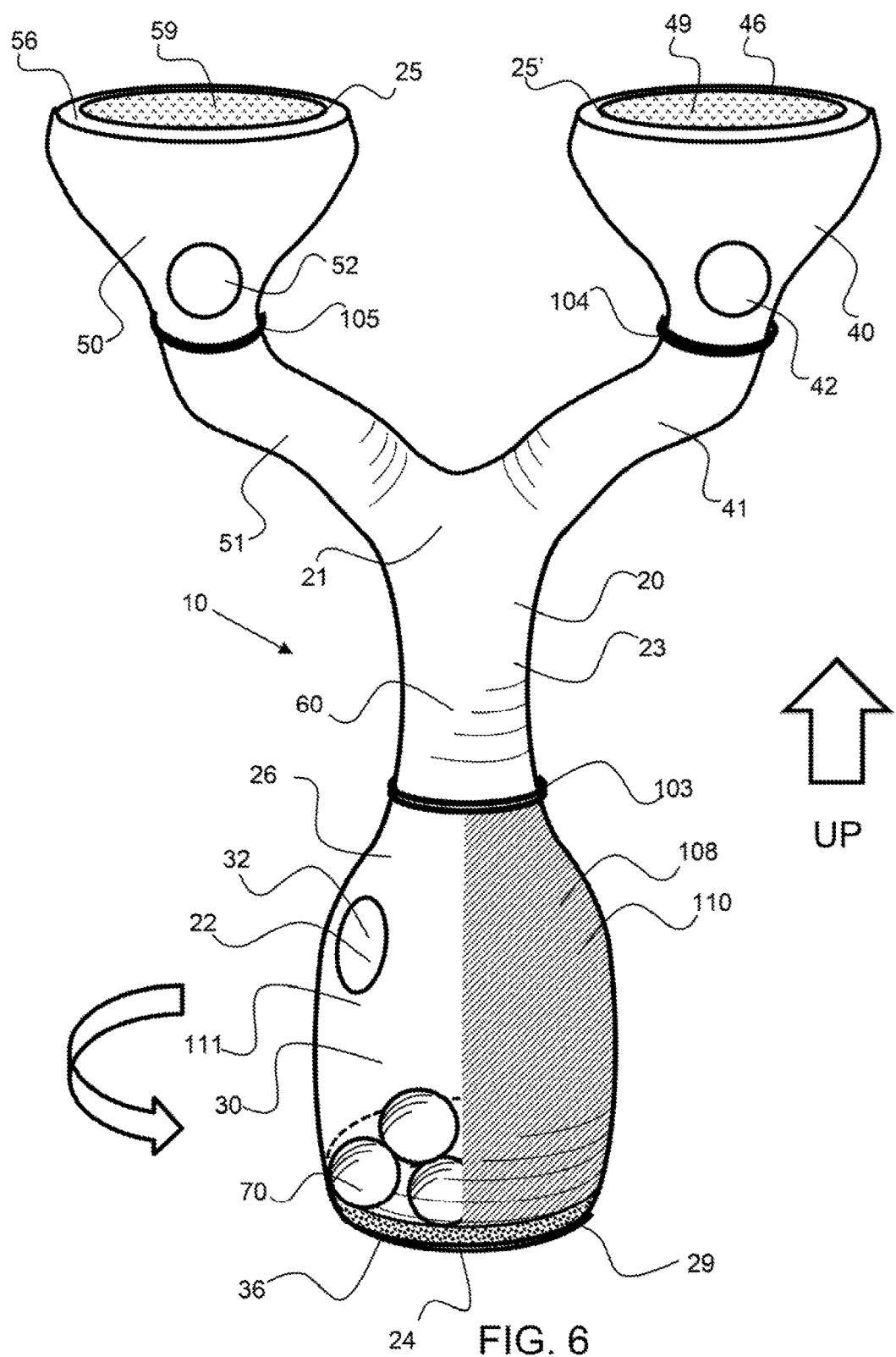

FIG. 6 shows the exemplary arithmetic educational tool shown in FIG. 5 resting on the base of the main chamber and the seven objects collected within the main chamber.

Figure 7:
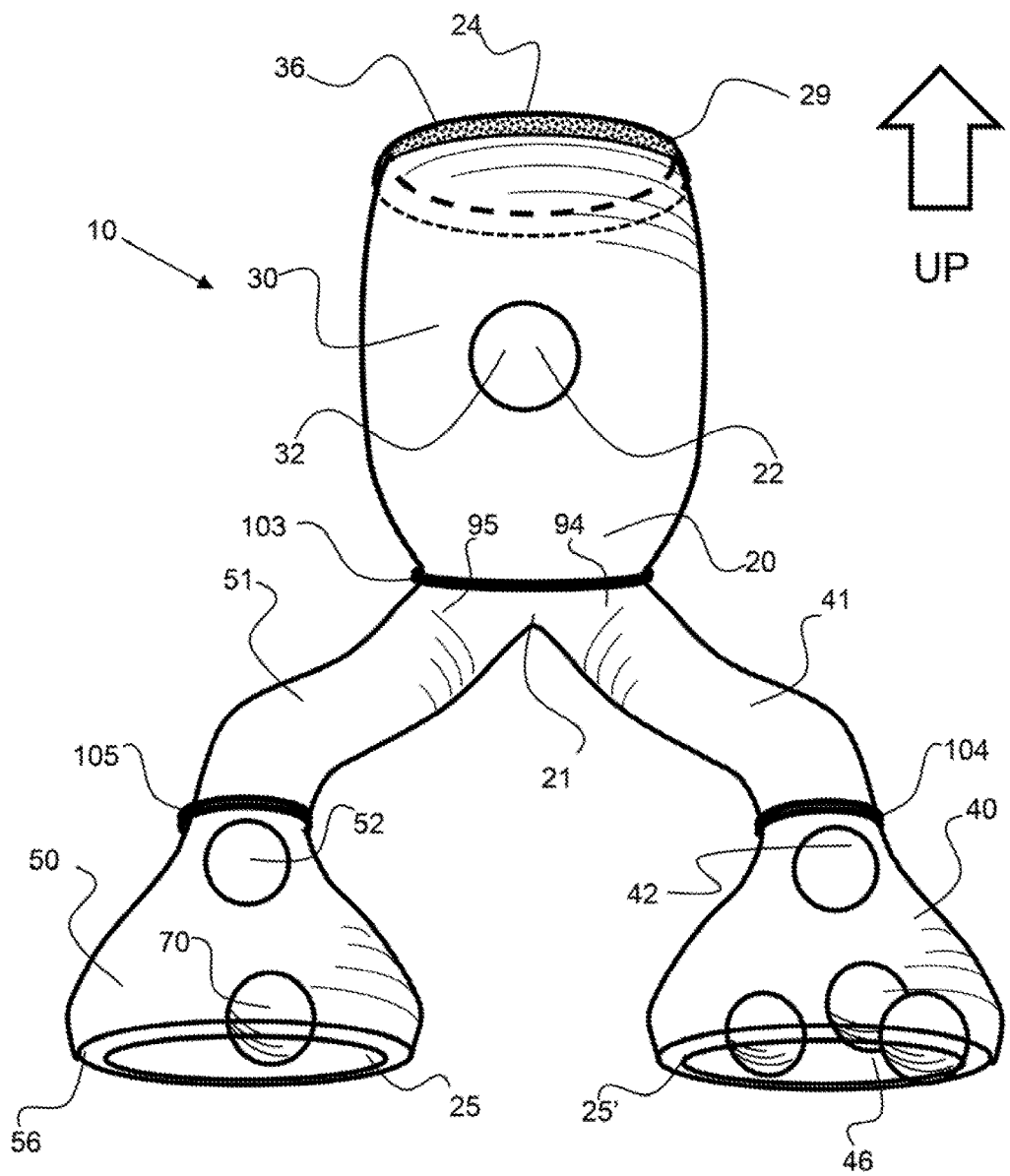

FIG. 7 shows an exemplary arithmetic educational tool comprising a bifurcated container with the bifurcated portion configured on the main chamber.

Figure 8:
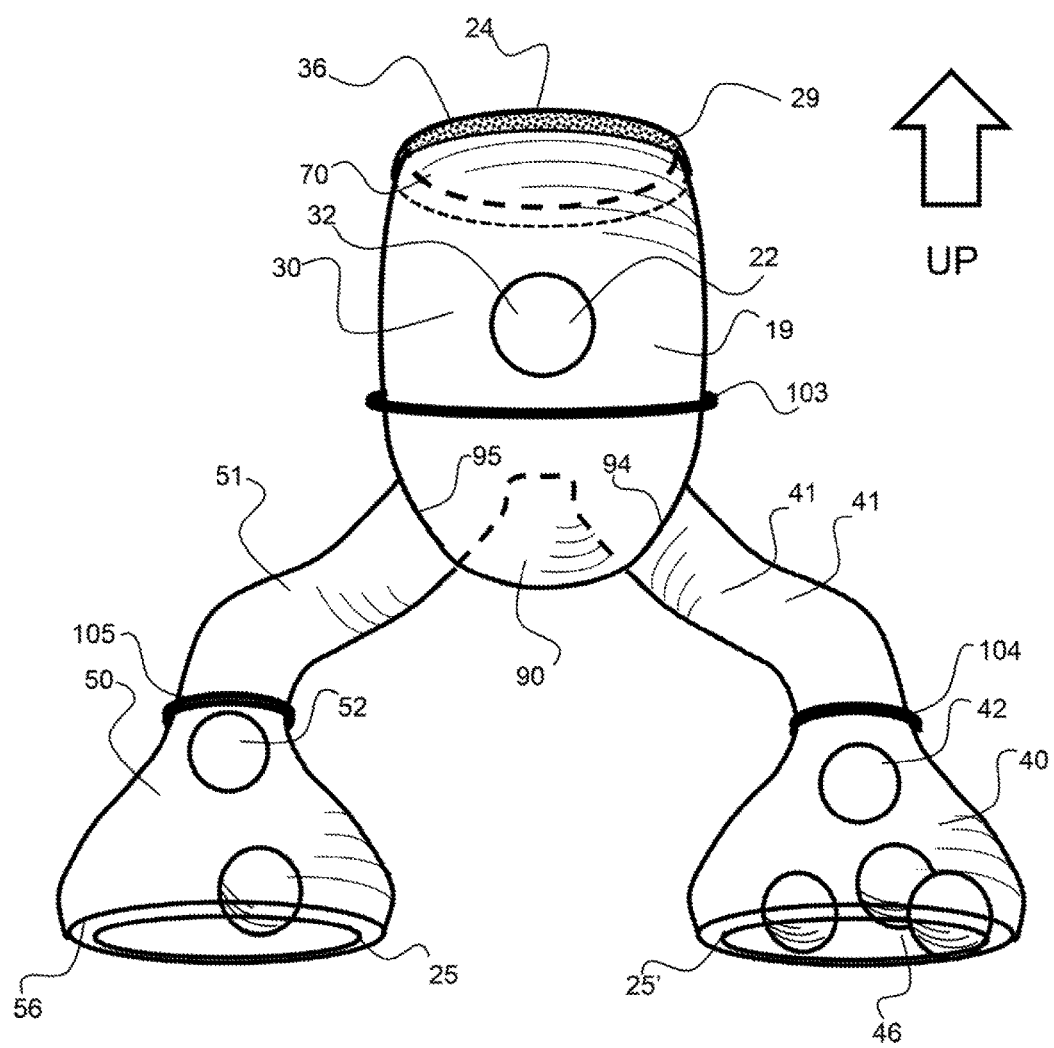

FIG. 8 shows an exemplary arithmetic educational tool comprising a bifurcated container having two chambers extending from the main chamber.

Figure 9:
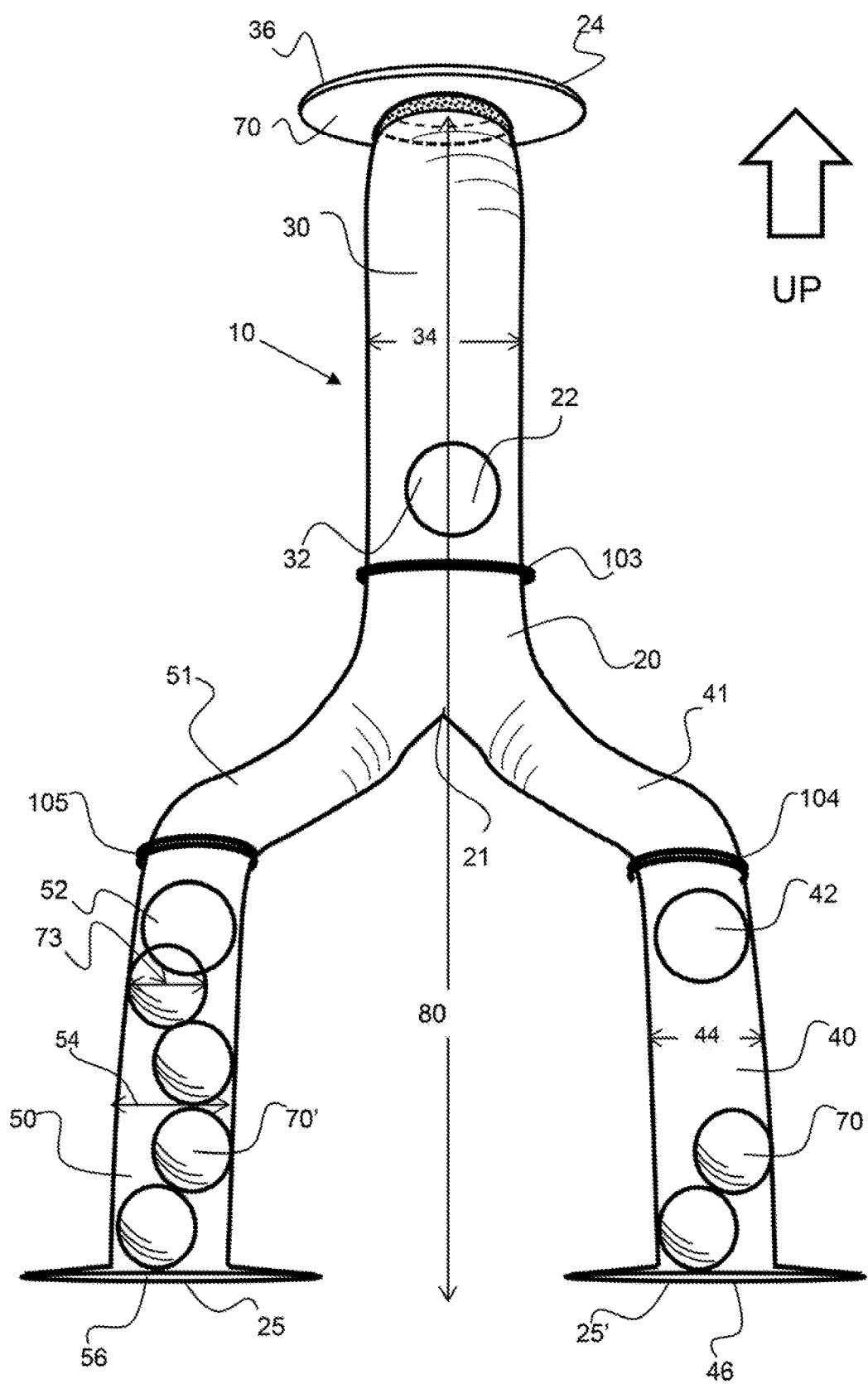

FIG. 9 shows an exemplary arithmetic educational tool comprising chambers that are large enough to fit a single object along the vertical axis therein.

Figure 10:
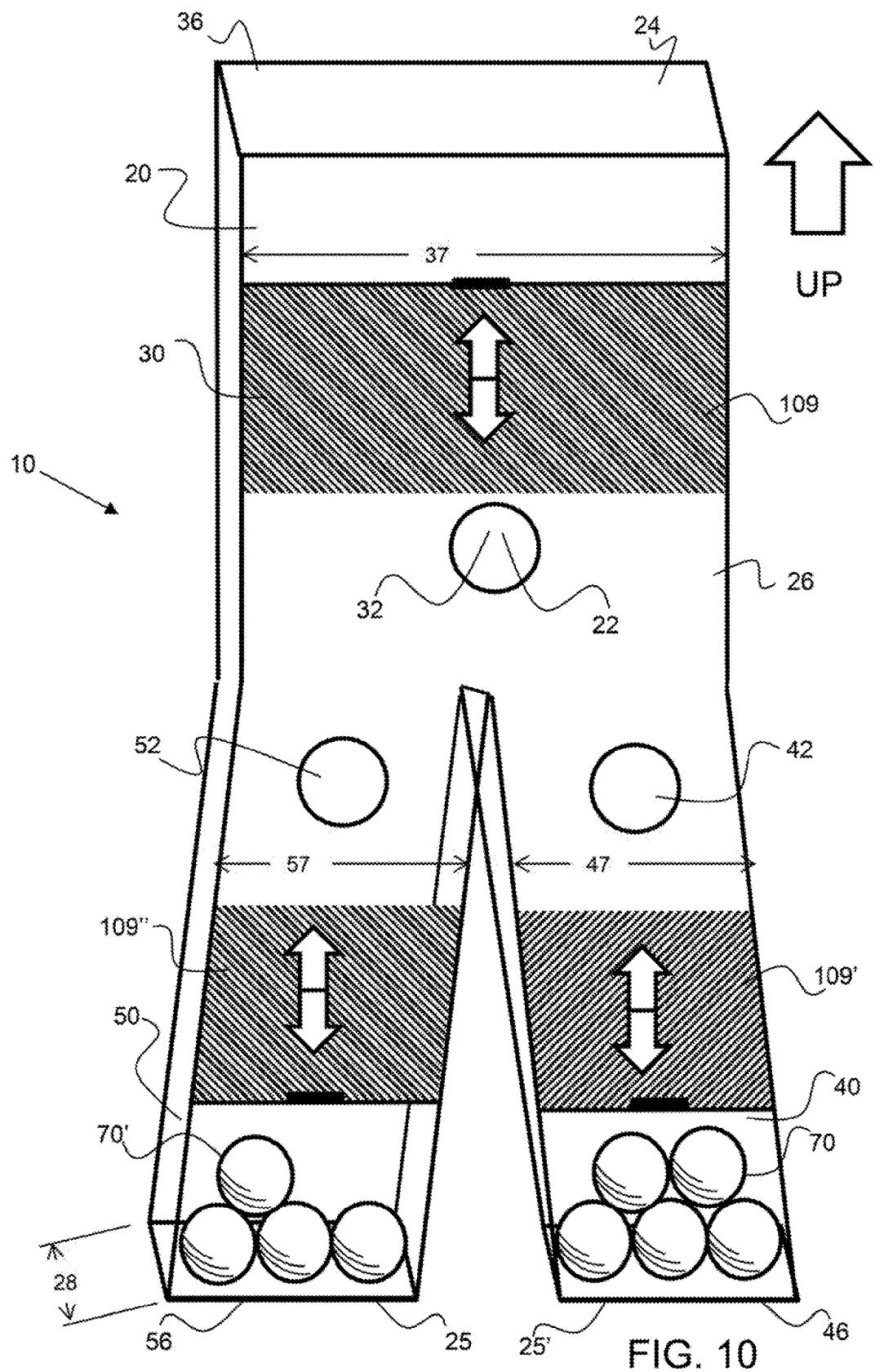

FIG. 10 shows an exemplary arithmetic educational tool comprising a chambers with a depth that are just large enough to accommodate one object but not larger than the diameter of two objects.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. In addition, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

Bifurcated, as used herein in relationship to the container, is defined as a container having a main chamber and at least two branches that lead to extended chambers.

Cap, as used herein, refers to any type of cover or closure for an aperture in the container, including the insertion apertures for the insertion of objects, and a base aperture, and may comprise a plug that is inserted into an aperture, a cover than is fit over the base end, a screw on type cover wherein the cover has threads that match with threads on the container, a sliding cover, wherein the cover is configured to slide within a slot of the container, and the like.

Transparent, as used herein with reference to the container, includes translucent exterior walls of the container that enable counting of objects within the container.

As shown in FIG. 1, an exemplary arithmetic educational tool 10 comprises a bifurcated container 20 having a main chamber 30 and two extended chambers 40, 50. The container has an interior volume 22 for receiving objects 70-70''' therein. Object 70''' is a different color than the other objects and this may be used to represent the number ten. It is to be understood that a ball of a second color may represent 100. The objects may be inserted into the container through insertion apertures, 32, 42, or 52. The bifurcated container is standing upright and resting on the base 24 of the main chamber. The first extended chamber 40 and the second extended chamber 50 each have a base 46, 56 and a cap configured thereon, 49, 59, respectively. The bifurcated container has a bifurcated portion 21, wherein the main chamber branches into the two extended chambers. The main chamber may be reduced in cross sectional area as it extends to the bifurcated portion and this reduced cross sectional area portion of the main chamber, or connecting portion 60, may have any suitable length. The connecting portion may add to the visual effect of the objects moving from the main chamber to the two extended chambers, and vice versa. The cross-sectional area of the connecting portion may be about 20% less, about 30% less, about 50% less than the cross-sectional area of the main chamber. The container may comprise an exterior wall 23, defining the interior volume of the container that is contiguous, or a one-piece unit. As shown, the bifurcated container 20 is sitting upright on a first end 24, or base of the main chamber, and the two extended chambers extend to a second end 25. A cap 39 is configured on the main chamber to allow easy removal and addition of objects into the container. The base 29 has a plurality of detents 75 that are configured to hold the objects is a fixed position for easy counting. Also shown in FIG. are connectors 103, 104, 105, for enabling the chambers to rotate from a position where the contents can be seen through a transparent/translucent exterior wall, to a position where the contents are hidden. A back side of the chamber may opaque and thereby hide contents within the chamber from view when oriented toward the user.

FIG. 2 shows an exemplary the arithmetic educational tool 10 shown in FIG. 1 with the four objects 70-70''' placed within the interior volume 22 of the main chamber and the cap 59 of the second extended chamber 50 removed from the second chamber base aperture 59. The main chamber 30 is standing upright, on the main chamber base 36 and the bifurcated container is self-standing. The main chamber 30 of the bifurcated container 20 is therefore in a declined orientation with respect to the two extended chambers 40, 50. The objects 70 are therefore resting within the main chamber on the detents in a fixed position. The first chamber 40 is rotated by the collar 104 to expose the opaque side of the exterior wall of the first chamber to the user. The contents within the first chamber are thereby hidden from view.

FIG. 3 shows the exemplary arithmetic educational tool 10 shown in FIG. 2 with the main chamber 30 in an elevated, or up, orientation with respect to the two extended chambers 40, 50, and the four objects 70-70''' are retained in the two extended chambers. The objects divided randomly between the first and second chambers. This change in orientation of the bifurcated container, from FIG. 2 to FIG. 3 can be used to demonstrated decomposition or subtraction from a larger number to two smaller numbers. The main chamber base cap 39 is removed and has threads 77 for securing to the container, having mating threads 77'.

FIG. 4 shows an exemplary arithmetic educational tool 10 comprising a bifurcated container 10 having a main chamber 30, a first extended chamber 40, a second extended chamber 50 and a bifurcated portion 21. The bifurcated container has a length 37 from a first end 24 to a second end 25, or the most extended portion of either of the two extended chambers from the base 36 of the main chamber. The main chamber has a length 35 from the base 36 to the bifurcated portion 21, or where the main chamber branches into the two extended chambers. A portion of the length of the main chamber may be a connection portion 60, or a reduced cross-sectional area portion of the main chamber. A connecting portion may be a separate part that is coupled to each of the chambers by the collars, 103, 104, and 105. The main chamber has a diameter 34 and an insertion aperture 32 having a diameter 33. Each of the extended chambers 40, 50, has an insertion aperture 42, 52 having a diameter 43, 53, respectively. The insertion aperture diameters are larger than the diameter 73 of the objects 70, spheres as shown. A length axis 80 extends substantially perpendicularly from the center of the base of the main chamber and up between the two extended chambers. The two extended chambers are offset from each other by an offset distance 68. In an exemplary embodiment, the two main chambers symmetrically extended form the main chamber and from the length axis. Each of the extended chambers has a length 45, 55 extending from the bifurcated portion to the base 46, 56 of each extended chamber, respectively. Each extended chamber has a diameter 44, 54 at the base for the collection of objects, thereon. The chambers shown are flask shape, having a circular base that truncates to the bifurcated portion.

As shown in FIG. 5, an exemplary arithmetic educational tool 10 comprises a bifurcated container 20 that is resting on the first chamber base 46 and the second camber base 56, or the second end 25. The two extended chambers base ends are planar surfaces that are substantially parallel and aligned with each other, enabling the container to stand up-right on both base ends. In this embodiment, the base 36 of the main chamber is parallel with the base ends of the two extended chambers 46, 56 but offset by the length of the container 37. The length 37 of the container extends from the plane of the main chamber base to the plane of the two extended chamber base ends. The first chamber 40 comprises three objects 70 and the second chamber 50 comprises four objects 70' within the interior volume 22 of the container. The objects may be placed into the first and second chambers through the insertion apertures 42, 52, respectively to aid in the education of addition, or cumulating, whereby the student can count the objects as they are placed in the container. The interior base surface of the first chamber 84 and the interior base surface of the second chamber 85 may be sloped toward the front to cause the objects to rest along the front of the container 26, or front face of the chambers to facilitate counting. The interior surface of the main chamber 83 may also be sloped towards the front of the container to facilitate counting. In another embodiment, the depth of the container is only large enough to accommodate a single object and thereby causes the objects to stack in plane with each other.

FIG. 6 shows the exemplary arithmetic educational tool 10, shown in FIG. 5, resting on the base 36 of the main chamber 30, or first end 24, and partially rotated to expose the objects 70 therein. The teacher may have asked the student how many objects are in the main chamber before rotating the main chamber from the back side 108, or side having an opaque portion 110, to the front side 26, or translucent side or portion 111. The seven objects 70 collected within the main chamber are made visible to the student by the rotation from the back side to the front side, or from the opaque portion to the translucent portion of the chamber. The collar on the main chamber 103 that enables this rotation is an example of an obscuring feature. The re-orienting of the container from resting on the two extended chamber base ends to resting on the main chamber base 36 demonstrates addition in a physical and three dimensional visual way. The objects move from the first and second chambers and collect in the main chamber to where they can be counted. Again, the inside surface of the base of the main chamber may be sloped toward the front 26, to force the balls to stack along the front face to allow easy counting of the objects. In addition, the depth of the inside surface of the main chamber may be slightly larger than the diameter of the objects, thereby only allowing a single object to fit within the depth. This will again cause the objects to stack up vertically along the front face of the container for easy counting. The connecting portion or one side of the connecting portion may be opaque to obscure the objects moving between the chambers, thereby preventing the student from counting the objects as the move past the bifurcated portion into one of the chambers.

As shown in FIG. 7, the exemplary arithmetic educational tool 10 comprises a bifurcated container 20 with the bifurcated portion 21 extending directly from the main chamber 30. The openings to each of the extended chambers 94, 95, or branch openings, extend directly into the main chamber 30.

As shown in 8, an exemplary arithmetic educational tool 10 comprises a bifurcated container 20 having two extended chambers 40, 50 extending from the main chamber 30. A deflector 90 is configured on the interior surface 29 of the container and between the opening to the first chamber 94 and the opening the second chamber 95. The deflector ensures that the objects will move into one of the first or second chambers and will not be rest in the main chamber when the container is moved from an orientation with the main chamber down to an orientation with the main chamber up.

As shown in FIG. 9, an exemplary arithmetic educational tool 10 comprises chambers that are large enough to fit a single object along the vertical axis 80 therein. The diameter of the main, first and second chambers, 34, 44, and 54 respectively may be larger than the diameter of an object 73, but not larger than two objects, thereby forcing the objects to align vertically, or stack along the length of the chambers. This vertical alignment may facilitate counting of the objects as they move from the main chamber to the two extended chambers, and vice versa.

As shown in 10, an exemplary arithmetic educational tool 10 comprises chambers that are rectangular cross-sectional shape, having an interior depth 28 that is large enough to accommodate one object but not larger than the diameter of two objects. The objects will therefore stack within the chambers to facility counting. As shown in FIG. 10, there are five objects 70 in the first chamber 40 and four objects 70' in the second chamber 50. The main chamber has a larger width across the front face 37 than the two extended chambers width, 47, 57. The depth within the container is substantially uniform from the first end 24 to the second end 25. Also note that the base surfaces of the chambers are flat and planar to enable the container to be self-standing on the first 24 or second 25 ends. As shown in FIG. 10, slidable covers 109-109", an example of an obscuring feature, are configured to enable a teacher or user to hide the contents within the chambers. The slidable covers are configured to slide over the extended ends of the chambers and obscure contents therein from view. The slidable cover may be made out of an opaque material that does not allow viewing therethrough. A slidable cover is an example of a obscuring feature that enables a user to hide or obscure the contents of the chamber.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. An arithmetic educational tool comprising:
   a) a container comprising:
      i) a first end;
      ii) an interior volume;
      iii) an exterior wall enclosing said interior volume;
      iv) an insertion aperture opening through said exterior wall;
      v) a main chamber configured proximal said first end;
      vi) a first chamber coupled with and extending from said main chamber;
      vii) a second chamber coupled with and extending from said main chamber;
      viii) a plurality of objects that are configured to fit through the insertion aperture and into the interior volume of the container;
      ix) a bifurcated portion wherein the first and second chambers are coupled to each other and the main chamber at the bifurcated portion;
      whereby the plurality of objects are configured to move from the the main chamber to the bifurcated portion and subsequently into the first or second chambers;
      wherein the interior volume extends from the main chamber to the first and second chambers;
      wherein said plurality of objects are configured to move from the main chamber to the first and second chamber when the bifurcated container is tilted from a first orientation having the first end down to a second orientation having the first end up; and
      wherein each of the chambers has a transparent front surface to enable counting of objects therethrough.
2. The arithmetic educational tool of claim 1, further comprising a base aperture and base cap that is detachably attachable to the main chamber.
3. The arithmetic educational tool of claim 2, wherein both of the first and second chambers have a flat base that are substantially parallel and wherein the container is self-standing on said flat base of the first and second chambers.
4. The arithmetic educational tool of claim 1, wherein the main chamber has a flat base at the first end of the container and wherein the container is self-standing on said flat base.
5. The arithmetic educational tool of claim 1, wherein the first and second chambers extend directly from the main chamber in two distinct locations, and wherein there is a first opening in the main chamber that leads to the first chamber and a second opening in the main chamber that leads to the second chamber.
6. The arithmetic educational tool of claim 5, further comprising a deflector configured within the interior volume of the main chamber and between the first and second openings.
7. The arithmetic educational tool of claim 1, further comprising a connecting portion between the main chamber and the first and second chambers;
   wherein the connecting portion has a cross-sectional area along the length axis that is at least 30% less than a cross-sectional area of the main chamber along said length axis of the container.
8. The arithmetic educational tool of claim 1, wherein the insertion aperture is configured in the exterior wall of the main chamber.
9. The arithmetic educational tool of claim 1, comprising a plurality of insertion apertures, wherein one of said plurality of insertion apertures is configured in the main chamber and wherein one of said plurality of insertion apertures is configured in each of the first and second chambers.
10. The arithmetic educational tool of claim 1, wherein a plurality of objects are spheres that are configured to roll freely within the interior volume of the container.
11. The arithmetic educational tool of claim 1, wherein each of said first, second and main chambers has a base aperture and a base cap configured to detachably attach to the container.
12. The arithmetic educational tool of claim 1, wherein an interior base surface of a chamber is sloped towards a front of the container to cause objects therein to stack along the front face of the chamber.
13. The arithmetic educational tool of claim 1, wherein the containers comprises an obscuring feature comprising a movable opaque portion of a chamber that obscures the objects therein from view.
14. The arithmetic educational tool of claim 1, wherein the containers comprises a plurality of collars between the bifurcated portion and at least two of the first, second and main chambers, that enables said at least two chambers to rotate from an orientation that exposes an opaque portion, that obscures objects within the chamber from view, to an orientation that exposes a transparent portion that enables viewing of the objects within the chamber.
15. The arithmetic educational tool of claim 1, wherein the container comprises:
   a connecting portion having the bifurcated portion and that is coupled to each of said first, second and main chambers;
   a plurality of collars coupling the connecting portion with at least two of said first, second and main chamber and that enables the connected chambers to rotate from an orientation that exposes an opaque portion, that obscures objects within the chamber from view, to an orientation that exposes a transparent portion that enables viewing of the objects within the chamber.
16. The arithmetic educational tool of claim 1,
   wherein the main chamber has a flat base and wherein the container is self-standing on said flat base of the main chambers;

wherein both of the first and second chambers have a flat base that are substantially parallel and wherein the container is self-standing on said flat base of the first and second chambers;

wherein the interior volume extends from the main chamber to the first and second chambers; and wherein said plurality of objects move from the main chamber to the first and second chamber when the container is tilted from a first orientation having the first end down to a second orientation having the first end up; and wherein each of the chambers has a transparent front surface to enable counting of objects therethrough.

17. The arithmetic educational tool of claim 16, wherein the container comprises a plurality of collars between the bifurcated portion and at least two of the first, second and main chambers, that enables said at least two chambers to rotate from an orientation that exposes an opaque portion, that obscures objects within the chamber from view, to an orientation that exposes a transparent portion that enables viewing of the objects within the chamber.

18. An arithmetic educational tool comprising:
a) a container comprising:
  i) a first end;
  ii) an interior volume;
  iii) an exterior wall enclosing said interior volume;
  iv) an insertion aperture opening through said exterior wall;
  v) a main chamber configured proximal said first end;
  vi) a first chamber coupled with and extending from said main chamber;
  vii) a second chamber coupled with and extending from said main chamber;
  viii) a plurality of objects that are configured to fit through the insertion aperture and into the interior volume of the container;

wherein the interior volume extends from the main chamber to the first and second chambers;

wherein said plurality of objects are configured to move from the main chamber to the first and second chamber when the container is tilted from a first orientation having the first end down to a second orientation having the first end up; and wherein each of the chambers has a transparent front surface to enable counting of objects therethrough; and wherein the depth of the each of said first, second and main chambers is larger than the diameter of an object but not larger than the twice the diameter of an object;

wherein the objects are configured to stack in a planar configuration within the chambers.

* * * * *